United States Patent

Moore

Patent Number: 5,326,206
Date of Patent: Jul. 5, 1994

[54] METHOD FOR COMPENSATING FOR BOLT HOLE MISALIGNMENT AND BOLT ASSEMBLIES THEREFOR

[75] Inventor: Jack W. Moore, Fullerton, Calif.

[73] Assignee: Northrop Corporation, Los Angeles, Calif.

[21] Appl. No.: 49,889

[22] Filed: Apr. 19, 1993

[51] Int. Cl.5 .................... F16B 39/28; F16B 39/34; F16B 43/02

[52] U.S. Cl. .................... 411/113; 411/432; 411/533; 411/537; 411/970; 29/525.1

[58] Field of Search .................... 411/111–113, 411/366, 432, 533, 537, 970, 999; 403/408.1; 29/525.1

[56] References Cited

U.S. PATENT DOCUMENTS

| | | | |
|---|---|---|---|
| 1,886,272 | 11/1932 | Thomson | 411/537 X |
| 3,006,443 | 10/1961 | Siler | 411/337 |
| 3,145,362 | 8/1964 | Kleven | 411/368 |
| 3,313,197 | 4/1967 | Knohl | 411/537 X |
| 3,382,630 | 5/1968 | Chivers | 411/537 |
| 3,505,636 | 4/1970 | McDowell | 411/533 X |
| 4,334,599 | 6/1982 | Ritsema et al. | 411/537 X |
| 4,830,557 | 5/1989 | Harris et al. | 411/537 X |
| 4,860,513 | 8/1989 | Whitman | 411/537 |

FOREIGN PATENT DOCUMENTS 495976 11/1938 United Kingdom ................ 411/113

Primary Examiner—Neill R. Wilson
Attorney, Agent, or Firm—Terry J. Anderson; Robert B. Block; Karl J. Hoch, Jr.

[57] ABSTRACT

Method and assembly for producing shear-resistant attachment between a prefabricated top plate having a plurality of preformed bolt passage holes and a support member having a corresponding plurality of bolt-receiving holes which may be slightly out of alignment with the bolt passage holes in the top plate. The bolt passage holes are oversize and have conical walls, and the bolts have a rounded undersurface which makes line contact with the conical wall when each bolt is tightened into a nut or floating nut plate aligned and/or attached at the undersurface of the support member.

25 Claims, 2 Drawing Sheets

METHOD FOR COMPENSATING FOR BOLT HOLE MISALIGNMENT AND BOLT ASSEMBLIES THEREFOR

GOVERNMENT LICENSE RIGHTS

The U.S. Government has a paid-up license in this invention and the right in limited circumstances to require the patent owner to license others on reasonable terms as provided by the terms of contract F33657-81-C-0067 awarded by the United States Air Force.

BACKGROUND OF THE INVENTION

1. Field of the Invention

The present invention relates to improvements in replacement mechanical subassemblies and electronic enclosure units or panels such as prefabricated with bolt passage holes and designed to be bolted to a supporting structure having bolt receiving bores in predetermined fixed locations. The bolts may be threaded into floating nut plates attached to the support structure or into standard plain nuts. The aviation industry requires total interchangeability of such replacement units or line replaceable units (LRU's) of mechanical subassemblies and electronic enclosures for planes, space ships and other bodies. Such requirement presents alignment problems because the bolt receiving bores in the supporting structure and the bolt passage holes in the LRU's cannot be so precisely and immutably located, relative to each other, to provide exact registration or alignment with respect to all LRU's and all supporting structures. Center-to-center variations of up to about 0.03 inch are unavoidable and must be compensated.

One method for correcting for misalignment of bolt passage holes and bolt-receiving bores is to drill or re-drill and enlarge the bolt passage holes in the LRU on site for each assembly. Such a procedure is time-consuming and expensive and does not satisfy contractual requirements that line replacement units be prefabricated as interchangeable units.

Another method for compensating for small amounts of misalignment, up to about 0.03 inch, is to provide enlarged bolt passage holes or slots in the line replacement units so that although the bolt passage holes and the mounting structure bores are not concentric, the attachment bolts can be fastened into the bores and tightened to produce clamping frictional engagement between the LRU and the supporting structure.

However such frictional engagement does not provide protection against loosening and wear as a result of shear forces, such as is common in installations or assemblies subjected to vibration loads, as in the case of aircraft components. Vibrations produces shear forces, parallel to the mating surfaces of the LRU and the supporting structure, which can cause loosening of the bolts and relative slippage movement of the LRU and the supporting structure and enlargement or coining of the bolt passage holes and reduced reliability and life of the assembly. For these reasons the use of enlarged or slotted bolt passage holes, or any other system which does not provide shear force protection, is not permitted in critical assemblies which are subjected to high shear forces, such as assemblies subjected to substantial vibration forces.

Ideally, the shank of the attachment bolts will contact both the wall of the bolt passage holes in the LRU and the bolt passage holes in the support structure when the bolts are tightened into the threaded nut plates attached to the supporting structure so as to provide resistance to shear forces independent of frictional clamping engagement. Such engagement resists up to about fifteen times as much force as compared to assemblies using oversize bolt passage holes, the walls of which do not contact the shank of the tightened attachment bolts. As mentioned, the use of small or close tolerance bolt passage holes provides the desired bolt hole passage wall engagement but results in the misalignment problems discussed supra.

2. Discussion of the Prior Art

Reference is made to U.S. Pat. No. 3,006,443 which discloses an assembly for compensating for or correcting misalignment of the bolt passage holes in two sheets or plates being fastened together by means of bolts and nuts. Such assemblies are only useful for installations providing interior access for the attachment of bolt engaging nuts. Moreover such assemblies require the production, placement and manual positioning and orientation of bolt hole passage members in each of the sheets or plates being fastened together so that the bolted assemblies provide resistance against shear forces. Thus, the objectives and results of the invention of U.S. Pat. No. 3,006,443 are similar to those of the present invention but the means for producing said results differ substantially from those of the present invention.

Reference is also made to U.S. Pat. No. 3,382,630 which discloses nut-and-bolt assemblies for providing tiltable motion or self-adjusting connections between transparent windshield panels and supporting structure on an aircraft windscreen. Shear resistance is not provided since the connecting bolts do not maintain contact with the walls of the hole passages. Reference is also made to U.S. Pat. Nos. 3,145,362 and 4,860,513 which disclose fastening bolts having heads with rounded or tapered undersurfaces for engaging mating concave or tapered surfaces on a panel designed to be fastened to a supporting surface. The functions of these assemblies do not involve misalignment compensation or shear force resistance.

SUMMARY OF THE INVENTION

The present invention relates to methods and assemblies for providing prefabricated replacement surface panels or units containing a plurality of bolt-receiving bolt holes in predetermined locations, which panels or units are capable of self-aligning, shear-resistant attachment to supporting structures containing a corresponding number of threaded bolt-engaging bores in corresponding predetermined locations, even though the bolt holes and the bolt engaging bores may be misaligned, center to center, by up to about 0.03 inch. The invention is characterized by providing attachment bolts, or bolt-washer units, each having a hemispherical head undersurface which provides pivot surface or ball joint, and by providing prefabricated replacement panels or units in which the plurality of circular bolt holes are drilled oversized relative to the diameter of the shank of the bolts, such as by about 0.06 inch, so that the oversized holes are capable of alignment with threaded bores in the support member which may be out of concentric alignment by up to one-half of the oversize of the bolt holes in the replacement panels, such as by up to 0.03 inch. The shear force resistance of the present assemblies is produced by providing each of the oversize bolt passage holes in the replacement panels with a conical countersink extending downwardly and inwardly at a substantial angle, such as 45°, to a substantial depth such as a depth equal to between about 50% to 70% of the thickness of the replacement panels, to provide a line-contact pivot surface for the hemispherical undersurface of the bolt. This permits the bolts to be tightened perpendicularly into the threaded nut plates attached below the bores of the support structure, and to attain peripheral line pressure engagement with the conical countersink of the oversized conical bolt passage holes in the replacement units when the bolts are tightened in place, even if the bolt passage holes are misaligned, center-to-center, with the threaded bores by a distance up to about one-half the extent of oversize of the bolt passage holes. Such line pressure engagement between the hemispherical undersurface of the bolts and the tapered walls of the bolt passage holes in each replacement unit produces a direct bearing force perpendicular to the surface of the conical countersink of the replacement panel or LRU and the spherical under surface of the bolt head (line contact). The bolt shank then transfers the force by bearing against the cylindrical surface of the support member. Thus the LRU is not only clamped down against the support member to provide frictional engagement therebetween, but the engagement is resistant to parallel shear forces, as caused by vibrations, independent of frictional engagement. Even though the bolt holes in the LRU are substantially oversized, for alignment compensation purposes, the bolts still engage the walls of the bolt holes because of the taper of the holes and the hemispherical undersurface of the bolt heads or of the bolt head washers which are closely-fitted to the bolt shanks.

THE DRAWINGS

FIG. 1 is a cross-sectional view of an attachment area of a captive bolt/line-replacement unit (LRU) secured to a support bracket by means of a locking nut, according to one embodiment of the invention in which the bolt head has an integral hemispherical under surface or pivot surface and a shank crown and spring washer beneath the LRU;

FIG. 2 is a similar cross-sectional view of a non-captive bolt/line-replacement unit assembly according to another embodiment of the invention in which the spaced pivot bolts comprise a hemispherical washer against the undersurface of the bolt head, the washer having a bore closely-fitted to the bolt shank, and the nuts comprising floating nut plates attached to the underside of the support bracket, and FIG. 3 is a similar cross-sectional view of a line-replacement unit flange secured to a mounting bracket by means of pivot bolts and self-aligning floating nut plates attached to the mounting bracket.

DETAILED DESCRIPTION

Figure 1:
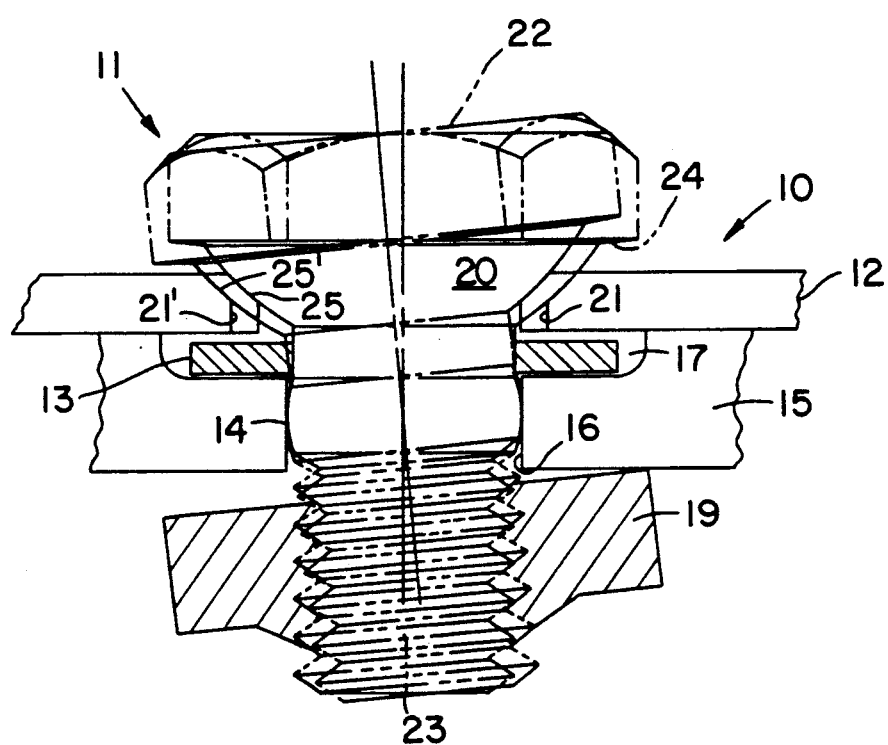

Referring to the section of the assembly of FIG. 1, the line replacement unit 10 (LRU) thereof is a captive or integral unit comprising pivot bolts 11, line replacement surface panel 12 and spring washer 13 confined between the underside of the panel 12 and an annular shank bulge 14 having a diameter slightly larger than the diameter of the bore of the washer 13. Each panel 12 carries a plurality of spaced bolts 11 and therefore the captive bolt embodiment is desirable in reducing the steps and time required for final assembly.

FIG. 1 further illustrate the presence of a bracket member 15 having a bolt-receiving bore 16 having a an undersurface diameter similar to the outer diameter of the bolt 11 and having an enlarged recessed bore area or well 17 at the upper surface thereof to loosely receive the washer 13 when the LRU is assembled with the bracket members 15 and the bolts 11 are tightened into locking nuts 19.

The most critical features of the LRU of FIG. 1 are the hemispherical or rounded undersurface 20 of the bolt 11 and the enlarged partly-chamfered bolt-receiving holes 21 in the panel 12. The bolt 11 has a head portion 22 and a shank portion 23. The rounded undersurface 20 of the head portion 22 has a maximum diameter less than the width of the head portion 22 so as to leave a peripheral flat head undersurface area 24.

The bolt receiving holes 21 in the panel 12 are chamfered or tapered or conical through a substantial portion of the thickness of the panel 12, i.e., between about 50% and 70% of said thickness, to provide a bolt entrance bore which is downwardly and inwardly tapered at a substantial angle, such as from about 40° to about 75°, to provide a line pressure pivot seat 25 for the bolt 11. Thus, even if the bolt receiving holes 21 in the line replacement plate 12 are not concentric with the bores 16 in the bracket member 15, the rounded undersurface 20 of the bolt 11 pivots to make peripheral line contact with the conical seat 25' of the plate 12 as the bolt is tightened into the locking nut 19 to produce strong shear-resistant attachment of the LRU, independent of frictional resistance.

Figure 2:
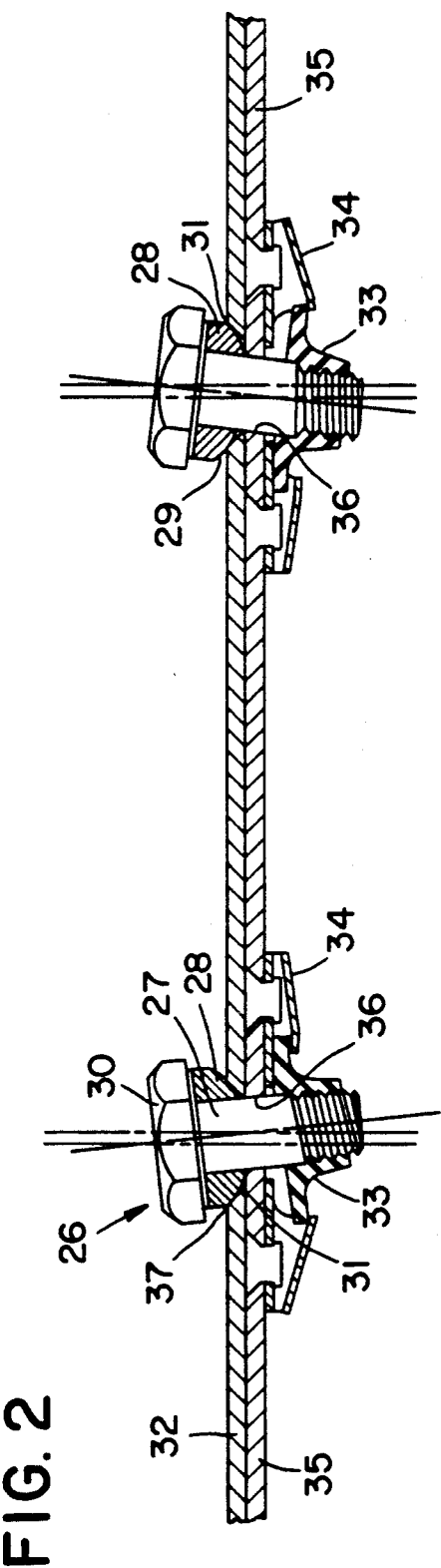

Referring to the embodiment of FIG. 2, the spaced pivot bolts 26 thereof comprise two-piece assemblies comprising the integral threaded bolt 27 assembled with a hemispherical washer 28 to form a rounded undersurface 29 adjacent the flat underside of the bolt head 30. As discussed with respect to FIG. 1, the holes 31 in the line replacement plate 32 are oversized to permit the bolt 26 to be threaded into the nuts 33 of floating nut plates 34 fixed to the support bracket 35 even though the bores 36 therein are not concentric with the oversized holes 31 in plate 32. Tightening of the bolts 26 into nuts 33 compresses the support bracket 35 between the plate 32 and the floating nut panel 34 and causes the bolt undersurface 29 to pivot and make line contact with the conical seat 37 of the line replacement plate to provide strong shear-resistant fastening of the LRU plate 32 to the support bracket 35, independent of frictional resistance. Referring to the embodiment of FIG. 3, the spaced pivot bolts 26 thereof are two-piece assemblies similar to that of FIG. 2, comprising the threaded bolt 27 assembled with a hemispherical washer 28 to form a rounded undersurface 29 adjacent the flat underside of the bolt head 30. As discussed with respect to FIG. 2, the holes 31 in the panel 32 are oversized to permit the bolt 26 to be threaded into the nuts 38 of self-aligning nut plates 39 fixed to the bracket member 40 even though the bores 41 therein are not concentric with the oversized holes 31 in panel 32. Tightening of the bolts 26 compresses the bracket member 40 between the panel 32 and the nut plate 39 and causes the rounded undersurface 29 to pivot and make line contact with the conical seat 37 of the line panel 32 to provide strong frictional and shear-resistant fastening of the panel 32 to the bracket member 40 independent of frictional resistance.

It will be apparent from the drawing that the present bolts may be unitary bolts formed with a rounded undersurface or may be conventional bolts assembled with a hemispherical washer to provide the rounded undersurface. Also bolts of either type may be assembled as captive elements of the line replacement units in the manner illustrated by FIG. 1 or by other means which will be apparent to those skilled in the art. It will also be apparent that the floating nut plates of FIGS. 2 and 3 can be replaced by standard nuts and washers if so desired.

It is essential that the bores in the line replacement plate 32 are oversize relative to the bolt shank diameter to allow for large hole location tolerances. For example the holes in the line replacement unit can be drilled 0.06 inch larger than the diameter of the shank companion area of the of bolt to accommodate hole misalignments up to about 0.03 the inch, center to center, with the threaded holes in the supporting structure which are a close fit on the bolt. While such oversizing permits any bolt to pass straight through to the support structure to provide clamping or frictional engagement, it is the combination of the rounded undersurfaces 20, 29 of the bolts and the conical seat areas 25, 37 of the oversized holes 26, 31 which provide adjustable surface engagement between the bolts and the conical seats 29, 37 of the bolt-receiving holes of the panels 12, 32, to produce shear-resistant fastening. The rounded or spherical surfaces of the bolts provide a self-adjusting load reaction component parallel to the mating surfaces by a direct bearing force perpendicular to the surface of the conical seat 23, 37 of the panel 12, 32. The bolt shank 23 then transfers the force by bearing against the cylindrical surface of the close-fitting hole 16, 36 in the bracket member 15, 35, 40.

When the hole centerlines are not concentric the bolt centerline changes its angle to accommodate the non-concentric condition. The spherical undersurface 20, 29 of the bolt head and the conical countersink 25, 36 of the plate holes 21, 31 simulate a ball/socket and permit the bolts to make peripheral line contact with the panel holes even though the bolts are at an angle relative to the line replacement plate. Thus the conical bores of the panel make continuous 360° line contact with the rounded undersurfaces of the bolts to provide excellent shear resistance even though the minimum diameter of the bolt receiving holes 21, 31 is larger than the diameter of the shank 23, 27 of the bolts. The enlarged holes 21, 31 permit the bolt shank 23 to be non-concentric relative thereto, to accommodate non-concentric bores in the support structure 25, 35, 40 while the rounded undersurface of the bolts is able to make line contact with the conical bores of the line replacement plate when the bolts are tightened.

Figure 3:
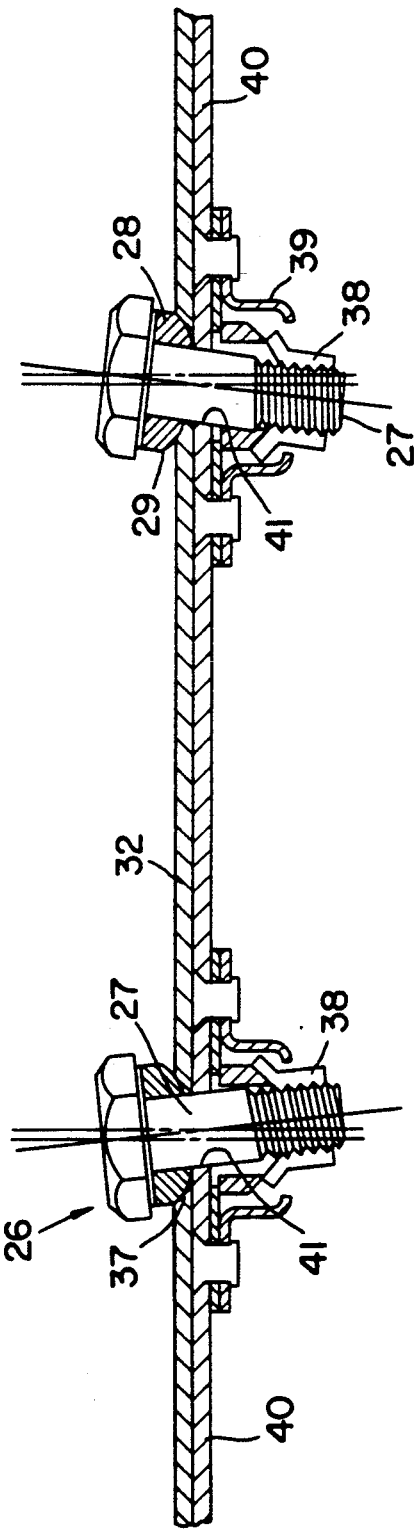

The standard floating nut plates 34 illustrated in FIG. 2 and the self-aligning floating nut plates 39 illustrated in FIG. 3 are conventional elements which are commercially-available for a variety of uses. In such uses, the frame portion of the housing thereof is riveted or otherwise attached to the underside of a lower plate or sheet, with the central bore portion thereof, and of the floating nut, aligned with a bore in the lower plate or sheet. Any misalignment between the bore in the top plate or sheet and the nut 33, 38 of the nut plate 34, 39 is compensated by movement or self alignment of the floating nut. However, without the rounded undersurface 20, 29 of the novel bolt assemblies of the present invention, the bolt head can only produce frictional engagement between the plates or members being connected, which engagement is not resistant to shear forces.

While the present invention was developed primarily to solve problems relating to the misalignment of bolt passage holes on prefabricated interchangeable line replacement units for aviation use, it will be apparent to those skilled in the art that the present combination of chamfered conical oversize bores in a top plate or panel in association with fastening bolts having a rounded undersurface head or washer head and a shank which is at least about 0.06 inch smaller in diameter than the minimum diameter of the oversize bores in the top plate is useful for accommodating misalignments between said bores and bolt-receiving bolt holes in a support structure, to provide shear resistant attachment.

It is to be understood that the above described embodiments of the invention are illustrative only and that modifications throughout may occur to those skilled in the art. Accordingly, this invention is not to be regarded as limited to the embodiments disclosed herein but is to be limited as defined by the appended claims.

I claim:

1. An assembly comprising a top plate having a plurality of bolt passage holes, said plate being in shear-resistant attachment to a support member having a corresponding plurality of bolt engaging bores even if said bolt passage holes and said bolt engaging bores are slightly out of alignment with each other, said assembly comprising a said top plate in which each of said bolt passage holes is formed to have a conical surface which tapers downwardly and inwardly through a substantial portion of the thickness of said plate to a minimum diameter, a said support member, and a plurality of threaded fastening bolts, one within each bolt passage hole and extending through a said bolt-engaging bore, each said bolt having a head provided with a rounded undersurface which engages the conical surface of said bolt passage hole at an intermediate location thereon, and having a threaded shank having a diameter which is substantially smaller than the minimum diameter of the bolt passage hole, whereby each bolt shank passes non-concentrically through its oversize bolt passage hole, engages a bore of a support member, which may be slightly out of alignment therewith, and is threadably engaged by a nut aligned below said bores at the undersurface of the support member, and each bolt is tightened into a said nut until its rounded undersurface makes continuous line contact with the conical surface of the bolt passage in the top plate to produce shear-resistant engagement between the top plate and the support member, independent of frictional resistance.

2. An assembly according to claim 1 further comprising a spring washer locked onto each said bolt at a location beneath said top plate to retain said bolts captive with said bolt passage holes.

3. An assembly according to claim 1 in which the bolt passage holes in said top plate have a conical countersink which extends through between about 50% to about 70% of the thickness of the top plate.

4. An assembly according to claim 1 in which the bolt passage holes in said top plate each have a countersink which tapers at an angle between about 45° to about 75° from the horizontal.

5. An assembly according to claim 1 in which each said nut is confined within a nut housing which permits alignment movement of said nut, and each said nut housing is secured to the undersurface of said support member.

6. An assembly providing fastener hole misalignment compensation and friction-independent resistance to shear forces, comprising:

a support member having a bolt engaging bore extending therethrough;

a nut secured to a surface of said support member in alignment with said bolt engaging bore;

a top plate positioned in contact with said support member opposite from said nut, said top plate having a bolt passage bore extending therethrough in an initial alignment with said bolt engaging bore, said bolt passage bore comprising a conical surface extending downwardly and inwardly from an upper surface of said top plate away from said support member toward said support member through a substantial portion of a thickness of said top plate to a minimum diameter of said bolt passage bore; and, a bolt extending through said bolt passage bore and said bolt engaging bore and engaging said nut, said bolt comprising a head provided with a rounded undersurface, said rounded undersurface pivoting and engaging said conical surface in bearing contact between an initial location thereon and a final location thereon upon a tightening of said bolt into said nut, a shank extending through said bolt passage bore and bolt engaging bore, said shank having a shank diameter less than said minimum diameter and being spaced from said top plate within said bolt passage bore, said shank diameter being substantially equal to a diameter of said bolt engaging bore, said shank engaging said support member in close fit bearing contact within said bolt engaging bore, and an end adapted for engagement with said nut, misalignment in said initial alignment between said bolt passage bore and said bolt engaging bore being compensated for by said pivoting of said rounded undersurface upon said tightening of said bolt, shear forces being resisted independent of frictional resistance by bearing contact between said rounded undersurface and said conical surface and by said close fit bearing contact between said shank and said support member within said bolt engaging bore.

7. The assembly according to claim 6, further comprising a spring washer secured to said shank at a location thereon proximate to a lower surface of said top plate opposite from said upper surface, whereby said bolt is retained captive with respect to said top plate.

8. The assembly according to claim 6, wherein said shank diameter is at least 0.06 inch less than said minimum diameter.

9. The assembly according to claim 6, wherein said conical surface extends downwardly and inwardly through between about 50% and about 70% of said thickness of said top plate.

10. The assembly according to claim 6, wherein said conical surface extends downwardly and inwardly at an agnle of between about 40° to about 75° relative to a plane of said upper surface.

11. The assembly according to claim 6, wherein said nut comprises a floating nut assembly having a floating nut plate housing secured to said surface of said support member and a floating nut movably confined within said floating nut plate housing.

12. The assembly according to claim 6, wherein said nut comprises a self-aligning floating nut plate assembly having:

a self-aligning floating nut plate secured to said surface of said support member and having first and second self-alignment members extending downwardly away from said surface of said support member; and, a self-aligning floating nut movably confined within said first and second self-alignment members.

13. The assembly according to claim 6, wherein said rounded undersurface provided to said head of said bolt comprises a surface of a hemispherical washer.

14. The assembly according to claim 6, wherein said shank includes a shank bulge portion, said shank being adapted for engagement with said support member by bearing contact between said shank bulge portion and said support member within said bolt engaging bore.

15. An assembly providing fastener hole misalignment compensation and friction - independent resistance to shear forces, comprising:

a support member having a fastener engaging bore;

a top plate positioned in contact with said support member and having a fastener passage bore in a first alignment with said fastener engaging bore;

a fastener extending through said fastener passage bore and said fastener engaging bore, said fastener being provided with a rounded undersurface portion engaging a conical surface of said top plate within said fastener passage bore and having a shank portion, said shank portion being spaced from said top plate within said fastener passage bore and engaging said support member in bearing contact within said fastener engaging bore; and, means attached to said support member for retaining said fastener in said fastener passage and fastener engaging bores, said rounded surface portion of said fastener pivoting and engaging said conical surface in continuous bearing contact during a tightening of said fastener into said retaining means to a second alignment of said fastener passage bore and said fastener engaging bore.

16. A method for compensating for fastener hole misalignment between members of a bolted assembly secured together in shear-resistant engagement independent of frictional resistance, comprising the steps of:

forming a bolt passage bore having a conical seat in a top plate of said assembly;

forming a bolt engaging bore in a support member of said assembly;

inserting a bolt through said bolt passage bore and said bolt engaging bore, a rounded undersurface provided to a head of said bolt engaging said conical seat in bearing contact, a shank portion of said bolt engaging said support member in bearing contact within said bolt engaging bore;

tightening said bolt into a nut secured to said support member, said rounded undersurface pivoting in bearing contact with said conical seat and said bearing contact between said rounded undersurface and said conical seat and between said shank portion and said support member being maintained upon said tightening.

17. A method for compensating for fastener hole misalignment between members of a bolted assembly secured together in shear-resistant engagement independent of frictional resistance, comprising the steps of:

forming a bolt passage bore in a top plate of said assembly, said bolt passage bore having a conical surface tapering downwardly and inwardly from an upper surface of said top plate through a substantial portion of a thickness of said top plate to a minimum diameter of said bolt passage bore and extending therefrom downwardly through a remaining portion of said thickness of said top plate;

forming a bolt engaging bore extending through a support member of said assembly;

providing a bolt for insertion into said bolt passage bore and said bolt engaging bore, said bolt comprising a head provided with a rounded undersurface adapted for engagement with said conical surface, a shank adapted for engagement with said support member by bearing contact within said bolt engaging bore, said shank having a shank diameter less than said minimum diameter and substantially equal to a diameter of said bolt engaging bore for close fit engagement therewith, and an end adapted for engagement with a nut secured in alignment with said bolt engaging bore to a lower surface of said support member;

positioning said top plate and said support member in position for being secured together, said bolt passage bore and said bolt engaging being in an initial alignment with each other;

inserting said bolt through said bolt passage bore and said bolt engaging bore, said end engaging said nut and said rounded undersurface engaging said conical surface at an initial location thereon, said shank being spaced from said top plate within said bolt passage bore;

tightening said bolt into said nut, said rounded undersurface pivoting in bearing contact with said conical surface upon said tightening from said initial location thereon to a final location thereon, said shank engaging said support member in bearing contact within said bolt engaging hole, whereby shear forces are resisted independent of frictional resistance by bearing contact between said rounded undersurface and said conical surface and by bearing contact between said shank and said support member within said bolt engaging bore, and a misalignment between said bolt passage bore and said bolt engaging bore is compensated for.

18. The method according to claim 17, wherein said inserting step comprises:

inserting said bolt through said bolt passage bore; thereafter, attaching a spring washer to said shank at a location thereon proximate to said top plate, whereby said bolt is retained captive with respect to said top plate; and thereafter, inserting said bolt through said bolt engaging bore.

19. The method according to claim 17, wherein said step of forming said bolt passage bore comprises forming said minimum diameter at lest about 0.06 inch larger than said shank diameter.

20. The method according to claim 17, wherein said step of forming said bolt passage bore comprises forming said conical surface extending downwardly and inwardly through between about 50% to about 70% of said thickness of said top plate.

21. The method according to claim 17, wherein said step of forming said bolt passage bore comprises forming said conical surface extending downwardly and inwardly from an upper surface of said top plate at an angle of between about 40° to about 75° relative to a plane of said upper surface.

22. The method according to claim 17, wherein said nut comprises a floating nut assembly having a floating nut plate housing secured to said lower surface of said support member and a floating nut movably confined within said floating nut plate housing.

23. The method according to claim 17, wherein said nut comprises a self-aligning floating nut plate assembly having:

a self-aligning floating nut plate housing secured to said lower surface of said support member and having first and second self-alignment members extending downwardly away from said lower surface of said support member; and, a self-aligning floating nut movably confined within said first and second self-alignment members.

24. The method according to claim 17, wherein said rounded undersurface provided to said head of said bolt comprises a surface of a hemispherical washer.

25. The method according to claim 17, wherein said shank includes an annular shank bulge portion having said shank diameter, said shank being adapted for engagement with said support member by bearing contact between said shank bulge portion and said support member within said bolt engaging bore.

* * * * *